(12) United States Patent
Jung et al.

(10) Patent No.: US 10,619,336 B2
(45) Date of Patent: Apr. 14, 2020

(54) BIDET AND BACKFLOW PREVENTING MEMBER THEREFOR

(71) Applicant: COWAY CO., LTD, Chungcheongnam-do (KR)

(72) Inventors: Da Woon Jung, Seoul (KR); Ji Won Han, Seoul (KR); Doo Youl Jeon, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 0 days.

(21) Appl. No.: 15/855,181

(22) Filed: Dec. 27, 2017

(65) Prior Publication Data

US 2018/0179746 A1  Jun. 28, 2018

(30) Foreign Application Priority Data

Dec. 28, 2016  (KR) .................. 10-2016-0180882
Feb. 27, 2017  (KR) .................. 10-2017-0025585

(51) Int. Cl.
*E03D 9/08* (2006.01)
*F16K 31/126* (2006.01)
*F16K 15/18* (2006.01)
*F16K 15/14* (2006.01)
*E03C 1/10* (2006.01)

(52) U.S. Cl.
CPC ............... *E03D 9/08* (2013.01); *E03C 1/104* (2013.01); *F16K 15/14* (2013.01); *F16K 15/144* (2013.01); *F16K 15/185* (2013.01); *F16K 31/126* (2013.01)

(58) Field of Classification Search
CPC ...................................................... E03D 9/08
USPC ............................................................ 4/420.4
See application file for complete search history.

(56) References Cited

U.S. PATENT DOCUMENTS

2012/0011647 A1*  1/2012  Mochita ............... E03D 9/08
                                                        4/443

* cited by examiner

*Primary Examiner* — Lauren A Crane
(74) *Attorney, Agent, or Firm* — Dority & Manning, P.A.

(57) ABSTRACT

A bidet comprises a water supply valve opened and closed to allow water to flow and including a backflow preventing means preventing water from flowing backward to a water inlet side; a heating portion heating water supplied through the water supply valve; and a backflow preventing member disposed on a rear end of the water supply valve and allowing water to be supplied or preventing water from flowing backward to the water inlet side due to water pressure, wherein the backflow preventing means and the backflow preventing member prevent water from flowing backward to the water inlet side in concert.

13 Claims, 15 Drawing Sheets

I-I'

I-I'

BIDET AND BACKFLOW PREVENTING MEMBER THEREFOR

CROSS-REFERENCE TO RELATED APPLICATION

This application claims the benefit of priorities to Korean Patent Application Nos. 10-2016-0180882, filed on Dec. 28, 2016 and 10-2017-0025585, filed on Feb. 27, 2017 with the Korean Intellectual Property Office, the entirety of which is incorporated herein by reference.

BACKGROUND

The present disclosure relates to a bidet and a backflow preventing member provided therein and, in more detail, to the bidet stably preventing backflow and the backflow preventing member provided therein.

In general, a washer referred to as a bidet is a device disposed in a toilet to clean the anus of a user, or the genitals of a female, using washing water dispensed from a washing nozzle after a user finishes using the toilet.

As illustrated in FIG. 1, a bidet 10 according to the related art may be configured to include a water supply valve 11 opened and closed to supply raw water, such as tap water, a heating portion 13 including an instantaneous water heater or a hot water tank to heat supplied water, a nozzle portion 15 including a cleaning nozzle, a bidet nozzle, or the like, and a flow path conversion valve 14 converting a flow path so as to selectively supply water to a nozzle provided in the nozzle portion 15.

The bidet 10 may be configured to receive tap water from a water supply, and a backflow preventing means 11a may be provided to prevent water in the bidet 10 from flowing backward to the water supply.

The backflow preventing means 11a may be integrally formed with an ON/OFF valve opening and closing a raw water flow path or a pressure reducing valve reducing the pressure of raw water to a specific level in the water supply valve 11. However, the backflow preventing means 11a may be configured separately from the ON/OFF valve or the pressure reducing valve.

Check valves (backflow preventing valves), generally operated by a spring, may be used as the backflow preventing means 11a.

However, backflow preventing valves (check valves) used as the backflow preventing means 11a in a bidet of the related art may have a limitation in which a spring is corroded or malfunctions due to foreign matter, when being used for a long period of time.

In a case in which the backflow preventing means 11a is not operated, as described above, there may be a problem in which water flows backward from a bidet to a water supply to contaminate the water supply.

SUMMARY

An aspect of the present disclosure provides a bidet and a backflow preventing member, stably preventing backflow by allowing a plurality of members for preventing backflow to be disposed therein, even in the case in which a problem occurs in one of the plurality of members.

An aspect of the present disclosure provides a bidet and a backflow preventing member provided therein, preventing backflow with a simple structure.

An aspect of the present disclosure provides a backflow preventing member stably preventing backflow in such a manner that a flow path is opened or closed through direct deformation of a component due to water pressure.

An aspect of the present disclosure provides a backflow preventing member stably blocking a flow path due to pressure of water flowing backward.

An aspect of the present disclosure provides a backflow preventing member simply disposed on a flow path of a bidet.

According to an aspect of the present disclosure, a bidet comprises: a water supply valve opened and closed to allow water to flow and including a backflow preventing means preventing water from flowing backward to a water inlet side; a heating portion heating water supplied through the water supply valve; and a backflow preventing member disposed on a rear end of the water supply valve and allowing water to be supplied or preventing water from flowing backward to the water inlet side due to water pressure. The backflow preventing means and the backflow preventing member prevent water from flowing backward to the water inlet side in concert.

In this case, the backflow preventing member may be disposed on a flow path between the water supply valve and the heating portion. Alternately, the backflow preventing member may be disposed on a flow path on a rear end of the heating portion.

According to an aspect of the present disclosure, a bidet further comprises a nozzle portion disposed on a rear end of a heating portion and including a plurality of nozzles outwardly dispensing water; and a flow path conversion valve converting a flow path to allow water flowing cut of the heating portion to be selectively supplied to the plurality of nozzles. A backflow preventing member is disposed between an outlet end of the heating portion and an inlet end of the flow path conversion valve.

In this case, the backflow preventing member may be disposed on the inlet end of the flow path conversion valve.

In addition, the backflow preventing means may include a check valve opening and closing the flow path by elastic force of a spring.

In addition, the backflow pre venting member may include a body portion including a water inlet port and a water outlet port, a flow path forming member disposed in a space in the body portion and including a connection passage connecting the water inlet port to the water outlet port, and an opening and closing member opening the connection passage by being elastically deformed due to water pressure on a water inlet side and closing the connection passage due to water pressure on a water outlet side.

In this case, the opening and closing member may include a support portion inserted into the flow path forming member and a film member connected to the support member and deformed due to water pressure to open and close the connection passage.

In addition, the film member may have a curved form in which a central portion is formed to be convex in a direction of the water outlet side in a state in which pressure is not applied thereto.

The connection passage may be formed as a plurality of connection passages on a perimeter of a support hole in which the support portion is disposed.

In addition, the opening and closing member may be formed using rubber or a silicone material.

According to another aspect of the present disclosure, a backflow preventing member comprises a body portion including a water inlet port and a water outlet port, a flow path opening and closing member disposed in a space in the body portion and including a water inlet end portion, into which water supplied from the water inlet port flows, and a water outlet end portion disposed on a side of the water outlet port. The water outlet end portion may be elastically deformed due to water pressure on a water inlet side to allow the water inlet port to be in communication with the water outlet port and may be closed due to water pressure on a water outlet side.

In this case, a body of the flow path opening and closing member may have a form in which a width of a portion on the water outlet side is decreased in a direction of the water outlet end portion in a state in which pressure is not applied thereto.

In addition, the flow path opening and closing member may have a form of a beak of a bird.

Furthermore, the flow path opening and closing member may be formed using rubber or a silicone material.

According to an aspect of the present disclosure, a backflow preventing member, mounted on a bidet including a backflow preventing means opened to allow water to flow and preventing backflow toward a water inlet side and used to prevent backflow toward the water inlet side in addition to the backflow preventing means, comprises a body portion including a water inlet port and a water outlet port, a flow path forming member disposed in a space in the body portion and including a connection passage connecting the water inlet port to the water outlet port, and an opening and closing member elastically deformed due to water pressure on the water inlet side to open the connection passage and to close the connection passage due to water pressure on the water outlet side.

In this case, the opening and closing member may include a support portion inserted into the flow path forming member and a film member connected to the support portion, having a curved form in which a central portion is convex in a direction of the water outlet side in a state in which pressure is not applied thereto, and deformed to open and close the connection passage due to water pressure on the water inlet side.

In addition, the opening and closing member may be formed using rubber or a silicone material.

BRIEF DESCRIPTION OF DRAWINGS

The above and other aspects, features, and advantages of the present disclosure will be more clearly understood from the following detailed description when taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The contents of the present disclosure described below may have a variety of configurations, and only a required configuration is proposed herein, but the present disclosure is not limited thereto.

First, with reference to FIGS. 2 and 3, a bidet 100 according to an exemplary embodiment in the present disclosure will be described.

Figure 1:
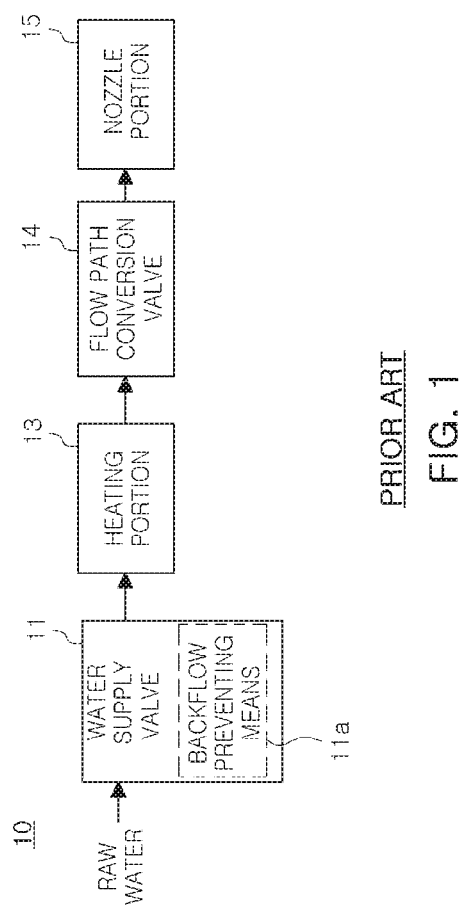
FIG. 1 is a schematic view of a flow path structure of a bidet of the related art.
Figure 2:
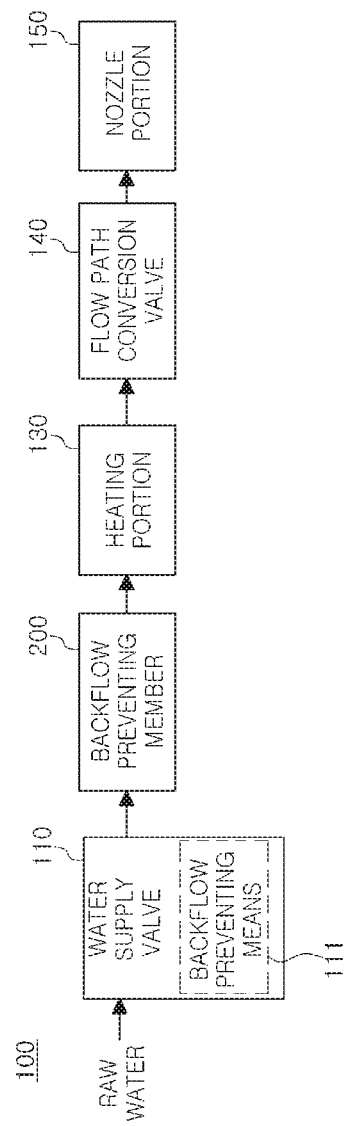
FIG. 2 is a schematic view of a flow path structure of a bidet according to an exemplary embodiment.
Figure 3:
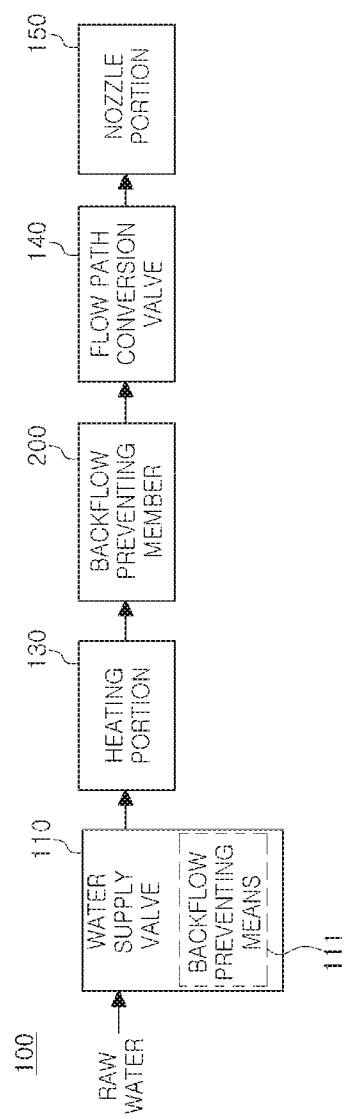
FIG. 3 is a schematic view of a flow path structure of a bidet according to another exemplary embodiment.
Figure 4:
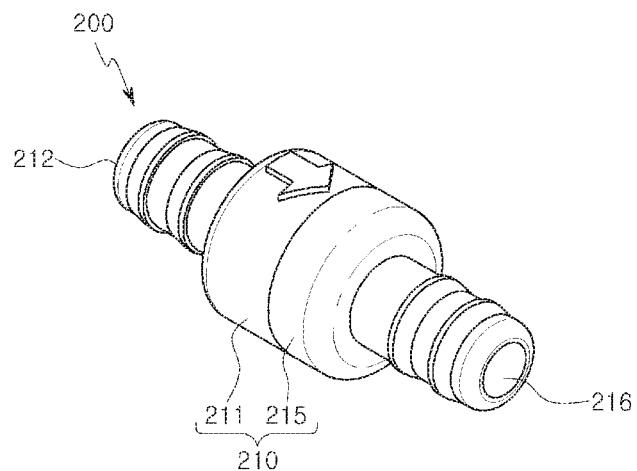
FIG. 4 is a perspective view of a backflow preventing member according to a first exemplary embodiment.
Figure 5:
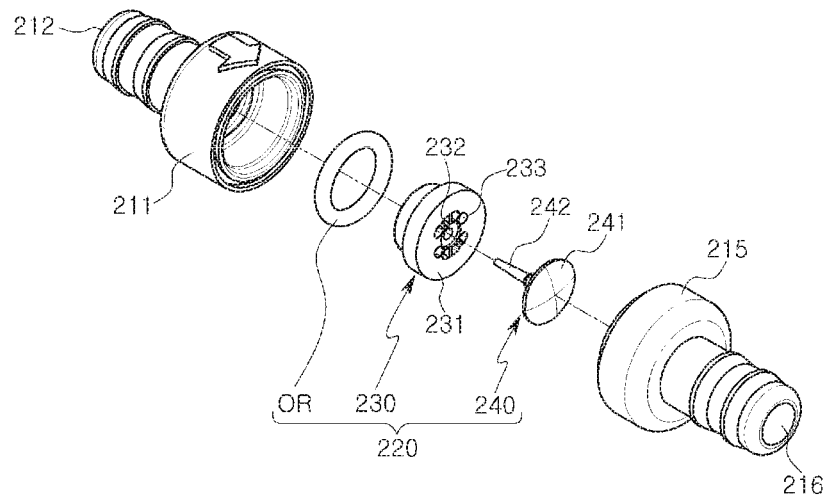
FIG. 5 is an exploded perspective view of a backflow preventing member illustrated in FIG. 4.

As illustrated in FIGS. 2 and 3, the bidet 100 according to an exemplary embodiment may be configured to include a water supply valve 11 opened and closed to supply raw water, such as tap water, a heating portion 130 including an instantaneous water heater or a hot water tank to heat water supplied through the water supply valve 110, and a backflow preventing member 200 disposed on a rear end of the water supply valve 110 to prevent water from flowing backward. In addition, the bidet 100 according to an exemplary embodiment may further include a nozzle portion 150 disposed on a flow path on a rear end of the heating portion 130 and including a plurality of nozzles, such as a cleaning nozzle or a bidet nozzle to dispense water to the genitals or the anus of a user and a flow path conversion valve 140 converting a flow path so that water flowing out of the heating portion 150 may be selectively supplied to the plurality of nozzles provided in the nozzle portion 150.

The water supply valve 110 may include a backflow preventing means 111 preventing backflow toward a water inlet side and may include an ON/OFF valve (not illustrated) opening and closing a raw water flow path or a pressure reducing valve (not illustrated) reducing pressure of raw water to a specific level. In this case, the backflow preventing means 111 may be integrally formed with the ON/OFF valve or the pressure reducing valve to form the water supply valve 110. However, the backflow preventing means 111 may be mounted on the water supply valve 110 as a component formed separately from at least a portion of the ON/OFF valve and the pressure reducing valve.

In general, a check valve (a backflow preventing valve) opening and closing a flow path by elastic force of a spring may be used as the backflow preventing means 111, but the present disclosure is not limited thereto, as long as backflow may be prevented.

The backflow preventing member 200 may be disposed on the rear end of the water supply valve 110. The backflow preventing member 200 may be elastically deformed due to water pressure to allow water to be supplied or to prevent backflow toward the water inlet side.

As such, the bidet 100 according to an exemplary embodiment may prevent backflow toward the water inlet side (a side of raw water, such as water supply, or the like) by the backflow preventing means 111 and the backflow preventing member 200. Thus, even in the case in which a single member to prevent backflow is not operated, backflow may be stably prevented.

The backflow preventing member 200 may be disposed on a flow path between the water supply valve 110 and the heating portion 130, as illustrated in FIG. 2. The backflow preventing member 200 may also be disposed on a flow path on the rear end of the heating portion 130, for example, on a flow path between a water outlet end of the heating portion 130 and a water inlet end of the flow path conversion valve 140. In addition, as illustrated in FIGS. 14 to 17, the backflow preventing member 200 may be disposed to be directly connected to the water inlet end 141 of the flow path conversion valve 140.

Subsequently, various exemplary embodiments of the backflow preventing member 200 will be described.

FIGS. 4 to 8 are views of a backflow preventing member 200 according to a first exemplary embodiment, FIGS. 9 to 13 are views of the backflow preventing member 200 according to a second exemplary embodiment, and FIGS. 14 to 17 are views of the backflow preventing member 200 according to a third exemplary embodiment.

With reference to FIGS. 4 to 8, the backflow preventing member 200 according to the first exemplary embodiment may include a body portion 210 having a water inlet port 212 and a water outlet port 216 and may include a backflow preventing portion 220 disposed to prevent backflow in a space in a body portion 210.

The body portion 210 may be configured in such a manner that a first body 211 and a second body 215 are coupled to each other. The backflow preventing portion 220 may be provided in an internal space formed by the first body 211 and the second body 215.

The backflow preventing portion 220 may include a flow path forming member 230 having a connection passage 233 connecting the water inlet port 212 to the water outlet port 216 and may include a opening and closing member 240 opening the connection passage 233 after being elastically deformed due to water pressure on a water inlet side and closing the connection passage 233 due to water pressure on a water outlet side. In addition, the backflow preventing portion 220 may include a sealing member OR sealing a space between the flow path forming member 230 and the body portion 210.

In the flow path forming member 230, a support hole 232 in which an opening and closing member 240 is disposed at a center of a body 231. A plurality of connection passages 233 may be formed on a perimeter of the support hole 232.

In addition, the opening and closing member 240 may include a support portion 242 inserted into the support hole 232 of the flow path forming member 230 and may include a film member 241 connected to the support portion 242 and deformed due to water pressure to open and close the connection passage 233. In addition, a protrusion 243, preventing the opening and closing member 240 from being detached from the support hole 232 of the flow path forming member 230 may be provided.

Figure 6A:
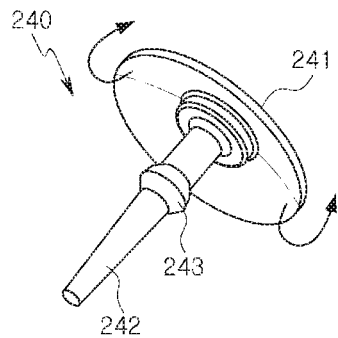
FIG. 6a is a perspective view of an opening and closing member illustrated in FIG. 5.
Figure 6B:
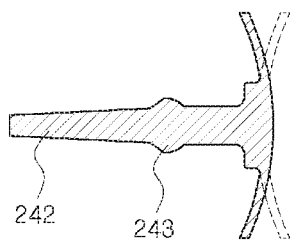
FIG. 6b is a cross sectional view of an opening and closing member illustrated in FIG. 5.

In addition, the film member 241 may have a curved term in which a central portion is formed to be convex in a direction of a water outlet aide in a state in which pressure is not applied thereto, as illustrated in FIG. 6. In other words, the opening and closing member 240 may have an umbrella form overall.

In addition, the film member 241 of the opening and closing member 240 may be formed using an elastic material so as to be easily deformed due to water pressure. For example, the film member 241 may be formed using rubber or a silicone material. Thus, the film member 241 may be easily deformed so that a peripheral portion thereof may be folded backward, as illustrated FIGS. 6 and 8. In this case, not only the film member 241, but also an entirety of the opening and closing member 240 may be formed using rubber or a silicone material for ease of molding.

Figure 7:
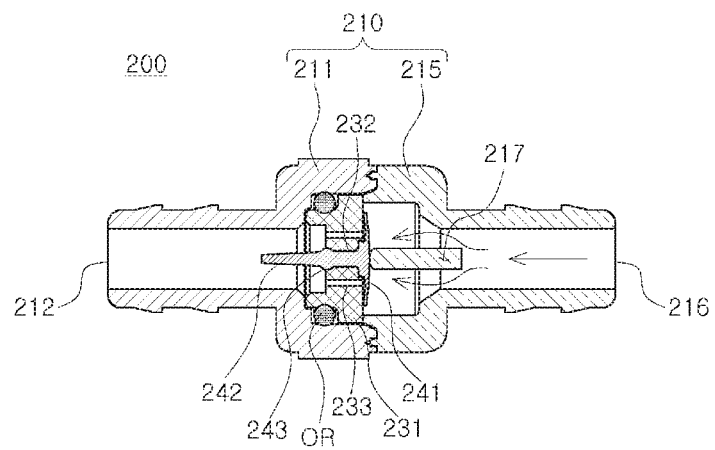
FIG. 7 is a cross-sectional view illustrating a form of the opening and closing member when water flows backward in the backflow preventing member illustrated in FIG. 4.

With reference to FIG. 7, in a case in which water pressure is applied to a side of the water outlet port 216, that is, in a case in which backflow occurs, the film member 241 may be configured to cover a connection passage 233 to block a flow path.

Figure 8:
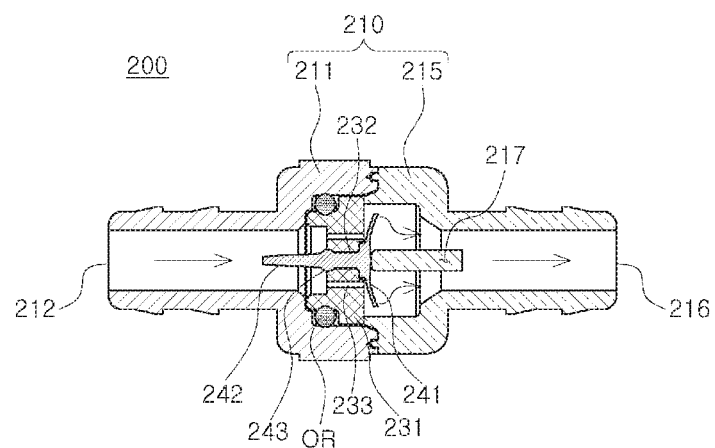
FIG. 8 is a cross-sectional view illustrating a form of the opening and closing member when water flows in the backflow preventing member illustrated in FIG. 4.
Figure 9:
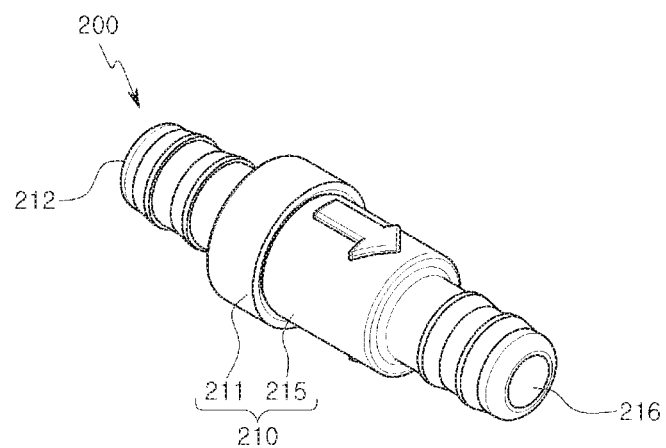
FIG. 9 is a perspective view of the backflow preventing member according to a second exemplary embodiment.
Figure 10:
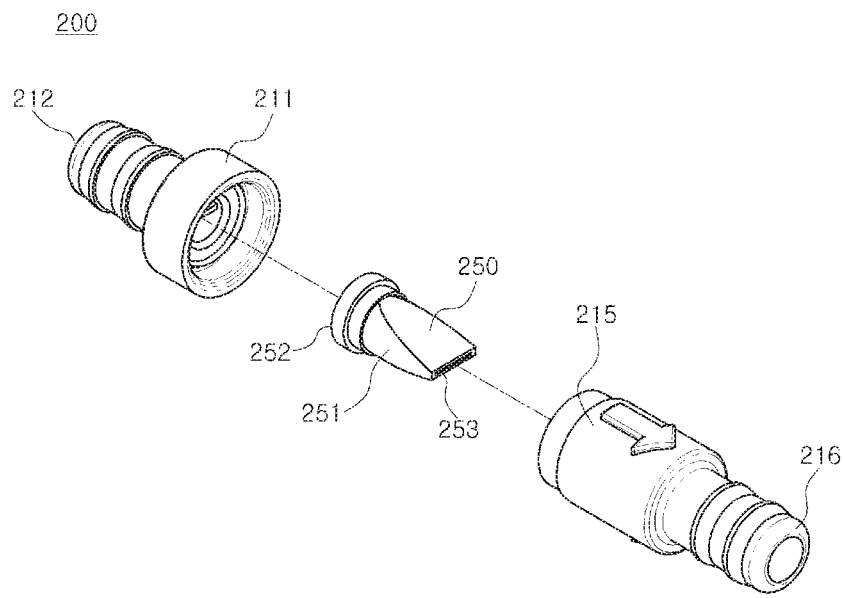
FIG. 10 is an exploded perspective view of the backflow preventing member illustrated in FIG. 9.

In addition, with reference to FIG. 8, in a case in which water pressure is applied to a side of the water inlet port 212, that is, in a case in which water is supplied, the film member 241 may be deformed due to water pressure to open the connection passage 233, thereby allowing water to be supplied from the water inlet port 212 to the water outlet port 216.

In the meantime, FIG. 8 illustrates a case in which only a peripheral portion of the film member 241 is lifted (folded back), and the connection passage 233 is opened, while the support portion 242 is fixed. However, in a case in which water is supplied from the water inlet port 212, a position of the protrusion 243 may be adjusted (e.g., a protrusion is formed on a left side of a case of FIG. 8) so that an entirety of the opening and closing member 240 may be slidably moved in a right direction, and the peripheral portion of the film member 241 may be deformed. In this case, opening of the connection passage 233 may be guaranteed.

In the meantime, as illustrated in FIGS. 7 and 8, a stopper 217 may be formed in the second body 215 to prevent the opening and closing member 240 from being detached in a direction of the water outlet port 216.

Subsequently, with reference to FIGS. 9 to 13, a backflow preventing member 200 according to a second exemplary embodiment will be described.

The backflow preventing member 200 according to the second exemplary embodiment may include a body portion 210 having a water inlet port 212 and a water outlet port 216 and may include a flow path opening and closing member 250 disposed in a space in the body portion 210.

The body portion 210 may be formed in such a manner that a first body 211 and a second body 215 are coupled to each other. The flow path opening and closing member 250 may be provided in an internal space in which the first body 211 and the second body 215 are formed.

In the flow path opening and closing member 250, a water inlet end portion 252 always opened may be formed on one end of a body 251 so that water supplied from the water inlet port 212 may flow thereinto. A water outlet end portion 253 opened or closed due to water pressure may be provided on a side of the water outlet port 216, that is, on the other end of the body 251.

Figures 11A, 11B:
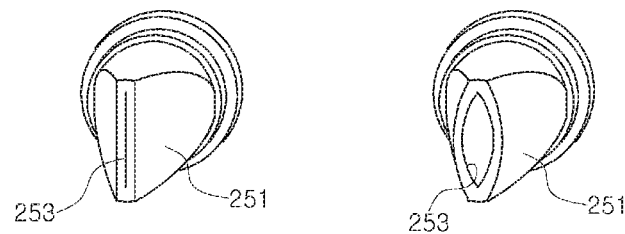
FIG. 11a is a perspective view of a flow path opening and closing member illustrated in FIG. 10 illustrating a state in which a flow path is closed.
FIG. 11b is a perspective view of a flow path opening and closing member illustrated in FIG. 10 illustrating a state in which the flow path is opened.
Figure 12:
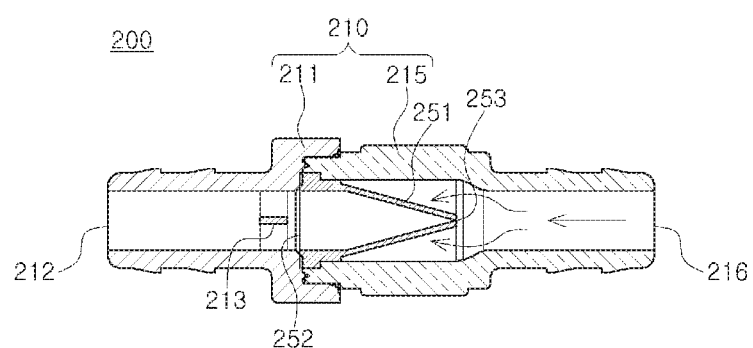
FIG. 12 is a cross-sectional view illustrating a form of the flow path opening and closing member when water flows backward in the backflow preventing member illustrated in FIG. 9.

As such, the water outlet end portion 253 may be elastically deformed due to water pressure on a water inlet side to allow the water inlet port 212 to be in communication with the water outlet port 216 (see FIGS. 11B and 13) and may be closed due to water pressure on a water outlet side to prevent backflow (see FIGS. 11A and 12).

In this case, the body 251 of the flow path opening and closing member 250 may have a form in which a width of a portion on the water outlet side is decreased in a direction toward the water outlet end portion 253, in a state in which pressure is not applied thereto.

In other words, the body 251 of the flow path opening and closing member 250 may have a form of a beak of a bird overall.

In addition, the flow path opening and closing member 250 may be formed using an elastic material so that ease of deformation of the flow path opening and closing member 250 due to water pressure may be facilitated. For example, the flow path opening and closing member 250 may be formed using rubber or a silicone material.

With reference to FIG. 12, in a case in which water pressure is applied to the side of the water outlet port 216, that is, in a case in which backflow occurs, the water outlet end portion 253 of the flow path opening and closing member 250 may be pressurized due to water pressure on the side of the water outlet port 216 to be closed, thereby blocking a flow path between the water inlet port 212 and the water outlet port 216.

Figure 13:
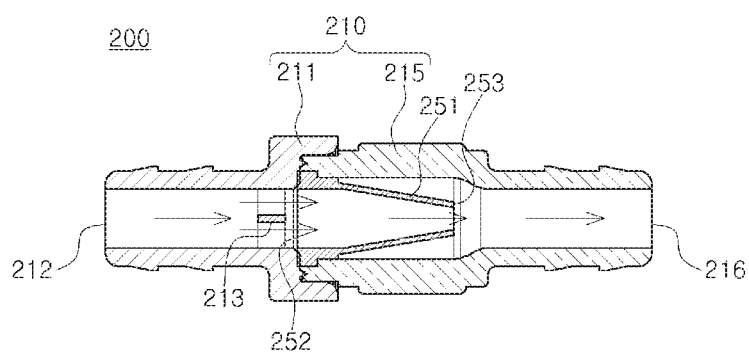
FIG. 13 is a cross-sectional view illustrating a form of the flow path opening and closing member when water flows in the backflow preventing member illustrated in FIG. 9.

In addition, with reference to FIG. 13, in a case in which water pressure is applied to the side of the water inlet port 212, that is, in a case in which water is supplied thereto, the water outlet end portion 253 of the flow path opening and closing member 250 may be deformed due to water pressure to be opened, thereby allowing water to be supplied to the side of the water outlet port 216 from the water inlet port 212.

In the meantime, as illustrated in FIGS. 12 and 13, a stopper 213 may be formed in the first body 211, in order to prevent the flow path opening and closing member 250 from being detached in a direction of the side of the water inlet port 212.

In addition, with reference to FIGS. 14 to 17, a backflow preventing member 200 according to a third exemplary embodiment will be described.

The backflow preventing member 200 according to the third exemplary embodiment may be the same as the backflow preventing member 200 according to the second exemplary embodiment in terms of an overall structure, but may only be different in terms of a position. Thus, detailed descriptions of the same or similar configurations will be omitted to avoid unnecessarily overlapped descriptions.

The backflow preventing member 200 according to the third exemplary embodiment is different from the backflow preventing member 200 according to the second exemplary embodiment, in that the backflow preventing member 200 according to the third exemplary embodiment is disposed directly on a water inlet end 141 of a flow path conversion valve 140.

In other words, in the case of the third exemplary embodiment, a body portion 210 may include a first body 211 and a second body 215 forming the water inlet end 141 of the flow path conversion valve 140. The first body 211 may have a cap form so as to be coupled to a second body 215 in a state in which a flow path opening and closing member 250 is inserted thereinto.

The backflow preventing member 200 according to the third exemplary embodiment may be the same as the backflow preventing member 200 according to the second exemplary embodiment, in that backflow is prevented due to deformation of a water outlet end portion 253.

Figure 16:
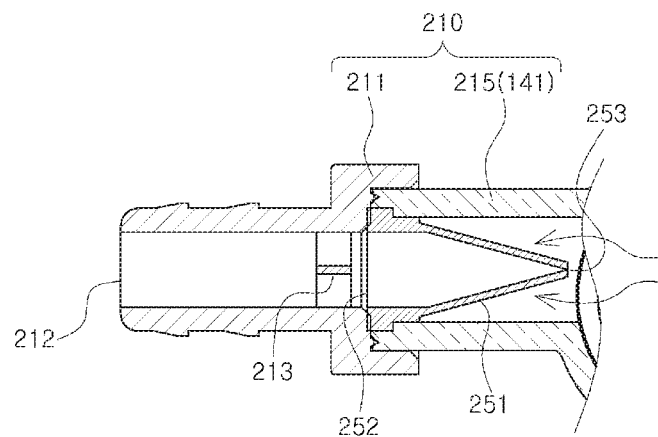
FIG. 16 is a cross-sectional view illustrating a form of the flow path opening and closing member when water flows backward in the backflow preventing member illustrated in FIG. 14.

In other words, as illustrated in FIG. 16, in a case in which water pressure is applied to a side of a water outlet port 216, the water outlet end portion 253 of the flow path opening and closing member 250 may be pressurized due to water pressure on the side of the water outlet port 216, thereby blocking a flow path between a water inlet port 212 and the water outlet port 216.

Figure 17:
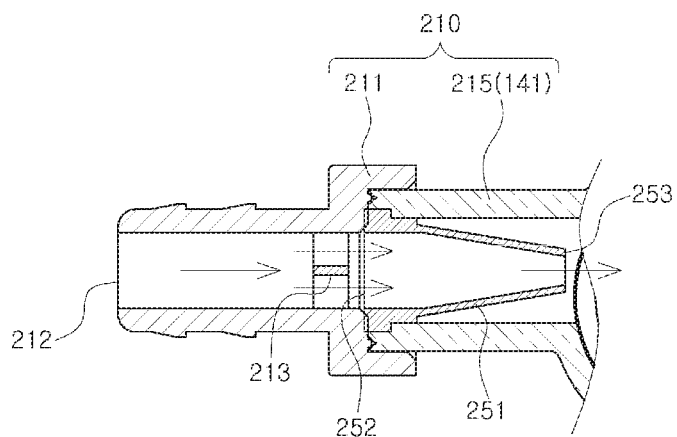
FIG. 17 is a cross-sectional view illustrating a form of the flow path opening and closing member when water flows in the backflow preventing member illustrated in FIG. 14.

In addition, as illustrated in FIG. 17, in a case in which water pressure is applied to the side of the water inlet port 212, the water outlet end portion 253 of the flow path opening and closing member 250 is deformed due to water pressure to be opened, thereby allowing water to be supplied to the side of the water outlet port 216 from the water inlet port 212.

Figure 14:
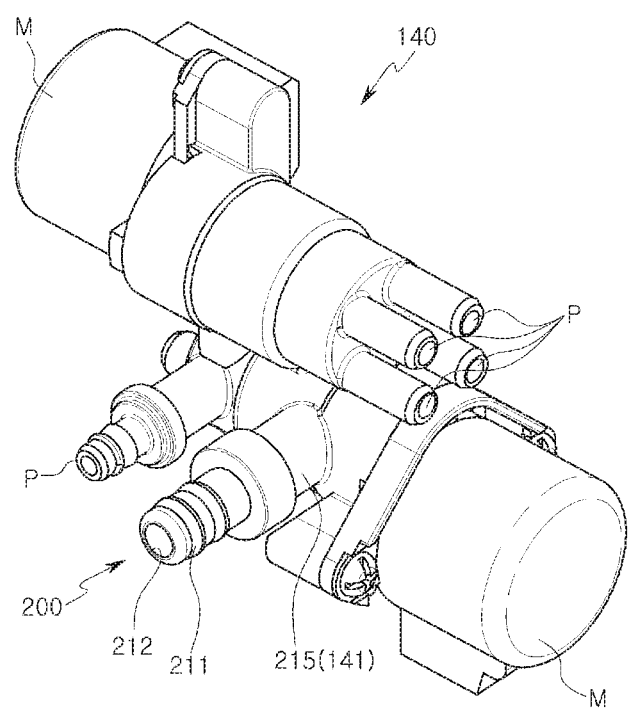
FIG. 14 is a perspective view of the backflow preventing member according to a third exemplary embodiment.
Figure 15:
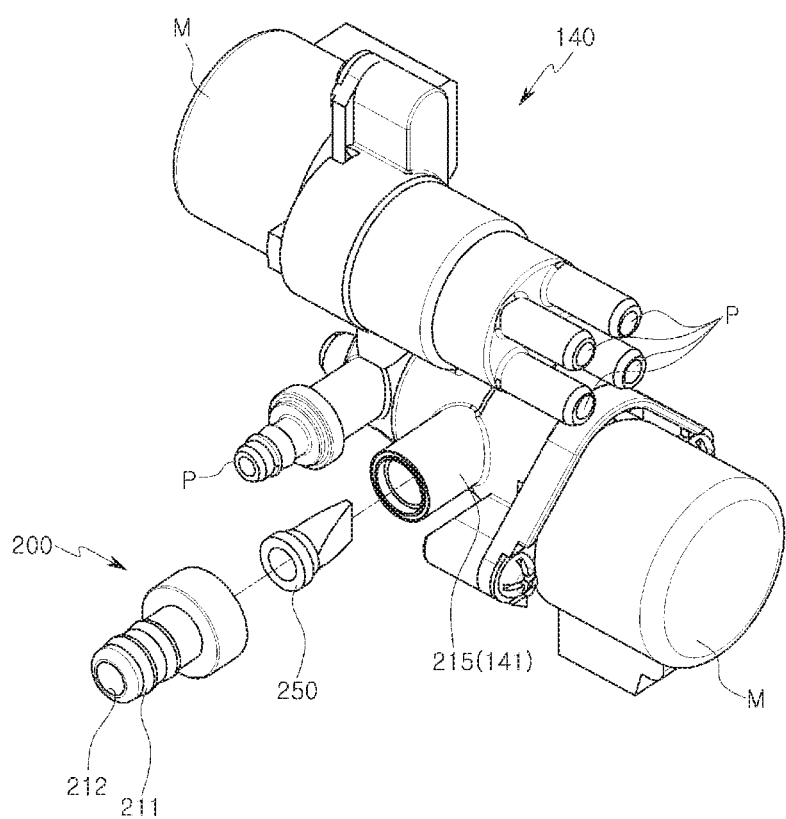
FIG. 15 is an exploded perspective view of the backflow preventing member illustrated in FIG. 14.

In the meantime, as illustrated in FIGS. 14 and 15, the flow path conversion valve 140 may be configured to convert a flow path connected to a plurality of ports P by driving a driving means M, such as a motor. Since a composition of the flow path conversion valve 140 has been known in various forms, detailed descriptions thereof will be omitted.

Figure 18:
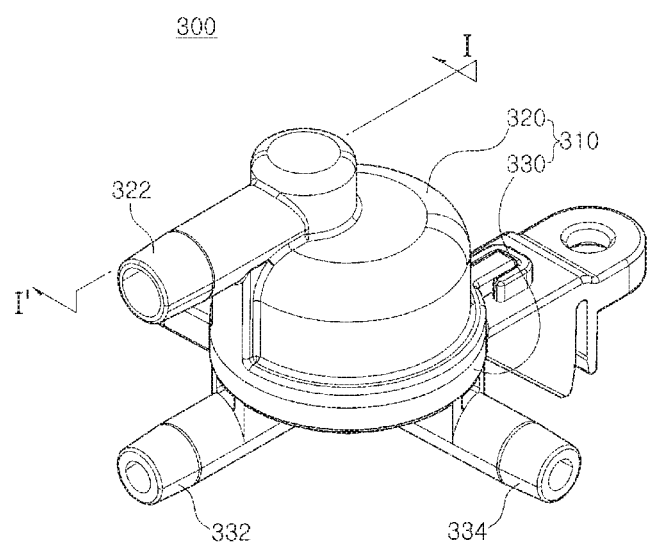
FIG. 18 is a perspective view of the backflow preventing member according to a fourth exemplary embodiment.
Figure 19:
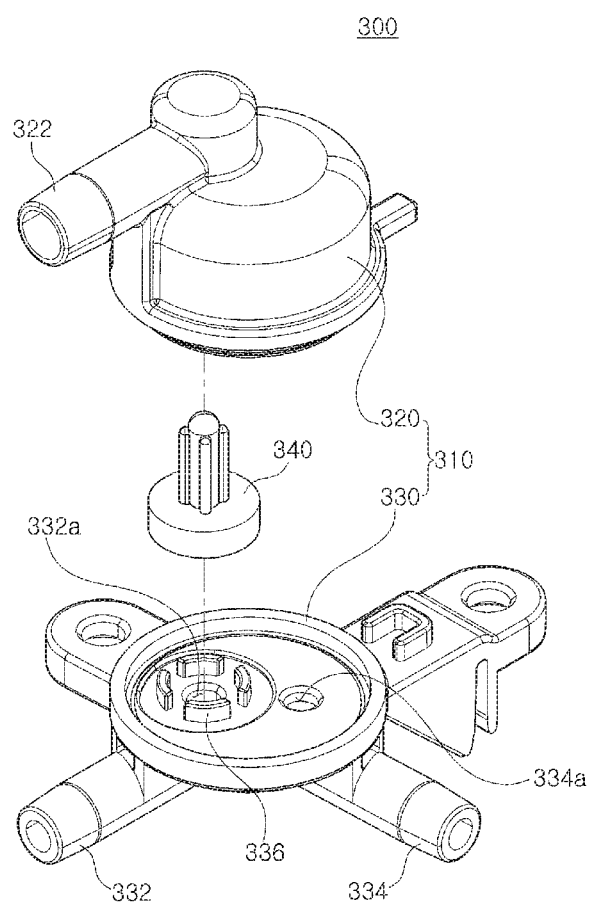
FIG. 19 is an exploded perspective view of the backflow preventing member illustrated in FIG. 18.
Figure 20:
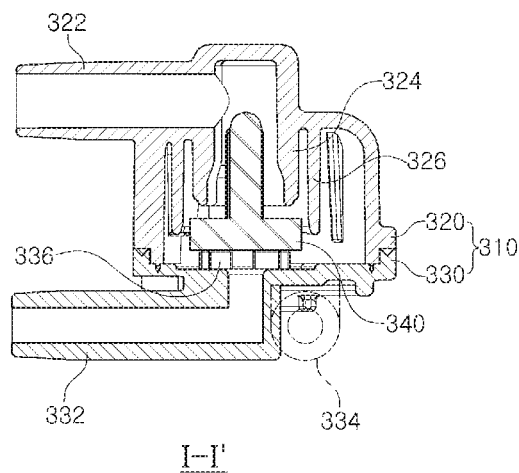
FIG. 20 is a cross-sectional view of the backflow preventing member illustrated in FIG. 18.

In the meantime, with reference to FIGS. 18 to 20, a backflow preventing member 300 according to a fourth exemplary embodiment will be described.

In an exemplary embodiment, the backflow preventing member 300 may be configured to include a housing 310 and a lifting member 340.

The housing 310 may have an internal space. The lifting member 340 may be disposed in the housing 310 so as to be lifted in an internal space of the housing 310. In the meantime, the housing 310 may include an upper housing 320 and a lower housing 330.

The upper housing 320 may have a substantially circular bowl form, and a lower end portion thereof may be opened. In addition, an air inlet and outlet port 322 for inlet and outlet of air may be provided in the upper housing 320.

The upper housing 320 may include a first cylindrical wall portion 324 and a second cylindrical wall portion 326, having a double bulkhead structure disposed to be eccentric from a central portion of the upper housing 320. The first cylindrical wall portion 324 may be connected to the air inlet and outlet port 322, so that air flowing thereinto and out thereof may flow out of the internal space of the housing 310 or may flow thereinto through an internal space of the first cylindrical wall portion 324.

The lower housing 330 may be coupled to a lower end portion of the upper housing 320. In the meantime, the lower housing 330 may include a water inlet port 332 formed to allow water to flow into the housing 310 and may include a water outlet port 334 formed to allow water to flow out of the housing 310.

In addition, in the lower housing 330, a water inlet hole 332a may be formed to be disposed below the first cylindrical wall portion 324, and a water outlet hole 334a may be provided to be disposed to be spaced apart from the water inlet hole 332a.

Furthermore, a plurality of mounting protrusions 336 on which the lifting member 340 is mounted may be provided on a perimeter of the water inlet hole 332a of the lower housing 330. The plurality of mounting protrusions 336 may be formed to be disposed below the first cylindrical wall portion 324.

The lifting member 340 may have a bar form in such a manner that an upper end portion thereof is disposed to be inserted into an interior of the first cylindrical wall portion 324. In a case in which water flows into an interior of the housing 310 through the water inlet port 332, the lifting member 340 may be lifted by water flowing thereinto.

In addition, in a case in which supply of water is stooped, the lifting member 340 may be lowered due to gravity to be mounted in the mounting protrusion 336. In this case, the lifting member 340 may be pressurized by a specific level of pressure (atmospheric pressure) by air flowing into the air inlet and outlet port 322. In other words, the lifting member 340 may be raised, only in a case in which pressure having a level higher than or equal to atmospheric pressure is applied thereto.

Figure 21:
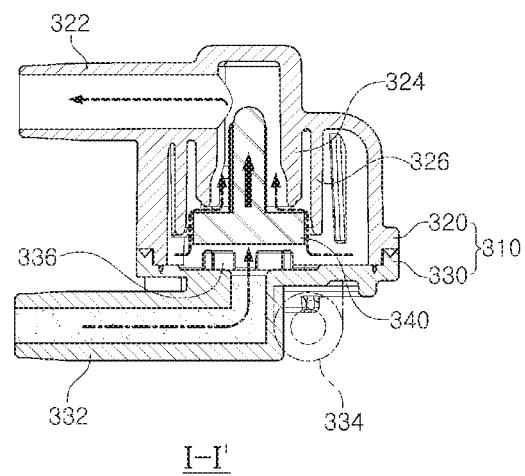
FIG. 21 is a cross-sectional view illustrating an operation when water flows in the backflow preventing member illustrated in FIG. 18.

In terms of an operation of the backflow preventing member 300 according to a fourth exemplary embodiment, as illustrated in FIG. 21, in a case in which water flows into an interior of the housing 310 through the water inlet port 332, air present in the housing 310 may flow out of the air inlet and outlet port 322 through an interior of the first cylindrical wall portion 324. In this case, pressure in the air inlet and outlet port 322 may be the same as atmospheric pressure, while pressure in the water outlet port 334 is higher than atmospheric pressure. Thus, in a case in which water flows into the housing 310, air present in the housing 310 may flow in a direction of the air inlet and outlet port 322 having a relatively low level of pressure.

Subsequently, the lifting member 340 may be lifted, and a lower end portion of the lifting member 340 may close the lower end portion of the first cylindrical wall portion 324. Accordingly, water supplied to an interior of the housing 310 may not flow out of the air inlet and outlet port 322.

As such, an obstruction of water flow, caused by air present on a flow path, may be reduced by discharging the air.

Figure 22:
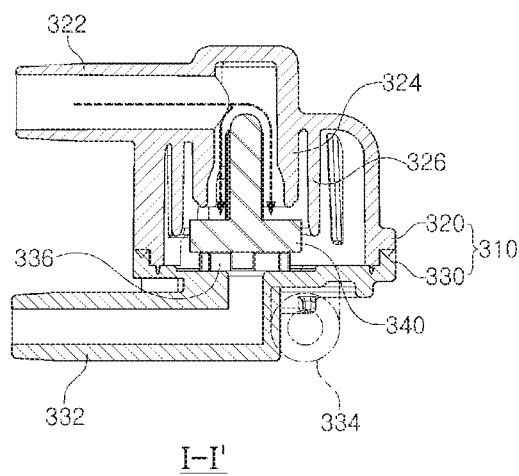
FIG. 22 is a cross-sectional view illustrating an operation preventing backflow in the backflow preventing member illustrated in FIG. 18.

Subsequently, in a case in which water does not flow into the interior of the housing 310, as illustrated in FIG. 22, the lifting member 340 may be lowered due to gravity to be mounted in the mounting protrusion 336. In this case, the lifting member 340 may be pressurized by a specific level of pressure (atmospheric pressure) by air flowing into the air inlet and outlet port 322. In other words, the lifting member 340 may toe raised, only in a case in which pressure having a level higher than or equal to atmospheric pressure is applied thereto.

As a result, generation of vacuum pressure may be reduced, thereby inhibiting backflow of water. In other words, the lifting member 340 may be lowered due to gravity to be mounted in the mounting protrusion 336. Thus, since water may only flow through a space between the plurality of mounting protrusions 336, backflow of water may be inhibited.

As set forth above, according to exemplary embodiments of the present inventive concept, a backflow preventing means may be disposed in a water supply valve, and an additional backflow preventing member may be disposed on a flow path on a rear end thereof, thereby stably preventing backflow in concert.

According to an exemplary embodiment, backflow may be prevented with a simple structure.

In addition, according to an exemplary embodiment, backflow may be stably prevented by an opening and closing member or a flow path opening and closing member, configured to open or close a flow path by being directly deformed due to water pressure.

Furthermore, according to an exemplary embodiment, backflow may be stably prevented in such a manner that the opening and closing member or the flow path opening and closing member may be formed to entirely close the flow path by pressure of water flowing back.

According to an exemplary embodiment, the flow path may be connected to a body portion, thereby allowing a backflow preventing member to be easily disposed.

While exemplary embodiments have been shown and described above, it will be apparent to those skilled in the art that modifications and variations could be made without departing from the scope of the present invention as defined by the appended claims.

What is claimed is:

1. A bidet, comprising:
   a water supply valve opened and closed to allow water to flow and including a backflow preventing means preventing water from flowing backward to a water inlet side;
   a heating portion heating water supplied through the water supply valve; and
   a backflow preventing member disposed on a rear end of the water supply valve and inhibiting water from flowing backward to the water inlet side due to water pressure,
   wherein backflow toward the water inlet side is prevented by the backflow preventing means and the backflow preventing member in concert,
   wherein the backflow preventing member comprises a housing including a water inlet port, a water outlet port, and an air inlet and outlet port and having an internal space; a lifting member disposed in the housing able to be lifted, wherein backflow is inhibited by preventing the lifting member from being lifted by pressure of air flowing through the air inlet and outlet port.

2. The bidet of claim 1, wherein the backflow preventing member is disposed on a flow path between the water supply valve and the heating portion.

3. The bidet of claim 1, wherein the backflow preventing member is disposed on a flow path on a rear end of the heating portion.

4. The bidet of claim 3, further comprising a nozzle portion disposed on the rear end of the heating portion and including a plurality of nozzles outwardly dispensing water; and a flow path conversion valve converting a flow path to allow water flowing out of the heating portion to be selectively supplied to the plurality of nozzles,
wherein the backflow preventing member is disposed between a water outlet end of the heating portion and a water inlet end of the flow path conversion valve.

5. The bidet of claim 4, wherein the backflow preventing member is disposed on the water inlet end of the flow path conversion valve.

6. The bidet of claim 1, wherein the backflow preventing means comprises a check valve opening and closing a flow path by elastic force of a spring.

7. The bidet of claim 1, wherein the housing comprises an upper housing including the air inlet and outlet port and a lower housing coupled to a lower end portion of the upper housing and including the water inlet port and the water outlet port.

8. The bidet of claim 1, wherein a first cylindrical wall portion into which an upper end portion of the lifting member is inserted and in which an air flow path connected to the air inlet and outlet port is formed is formed in the upper housing, and a mounting protrusion disposed below the first cylindrical wall portion and including the lifting member mounted in the mounting protrusion is formed in the lower housing.

9. The bidet of claim 8, wherein a water inlet hole is formed in the lower housing to be disposed on an internal side of the mounting protrusion, and the mounting protrusion is provided as a plurality of mounting protrusions disposed to be spaced apart from each other, an extension line of the mounting protrusion having a circular ring shape.

10. The bidet of claim 9, wherein, when water flows into an interior of the housing through the water inlet hole, air in an internal space of the housing flows into an air flow path formed by the first cylindrical wall portion, while the lifting member is lifted, to be discharged from the air inlet and outlet port.

11. The bidet of claim 9, wherein, when water flows into an interior of the housing through the water inlet hole, a lower end portion of the first cylindrical wall portion is closed by the upper end portion of the lifting member.

12. A backflow preventing member mounted on a bidet including a backflow preventing means opened to allow water to flow and preventing backflow toward a water inlet side and used to prevent backflow toward the water inlet side in addition to the backflow preventing means, the backflow preventing member, comprising:
a body portion including a water inlet port and a water outlet port;
a flow path forming member disposed in a space in the body portion and including a connection passage connecting the water inlet port to the water outlet port; and
an opening and closing member elastically deformed due to water pressure on the water inlet side to open the connection passage and to close the connection passage due to water pressure on the water outlet side;
wherein the opening and closing member comprises a support portion inserted into the flow path forming member and a film member connected to the support portion, having a curved form in which a central portion is convex in a direction of the water outlet side in a state in which pressure is not applied thereto, and deformed to open and close the connection passage due to water pressure on the water inlet side.

13. The backflow preventing member of claim 12, wherein the opening and closing member is formed using rubber or a silicone material.

* * * * *